UNITED STATES PATENT OFFICE.

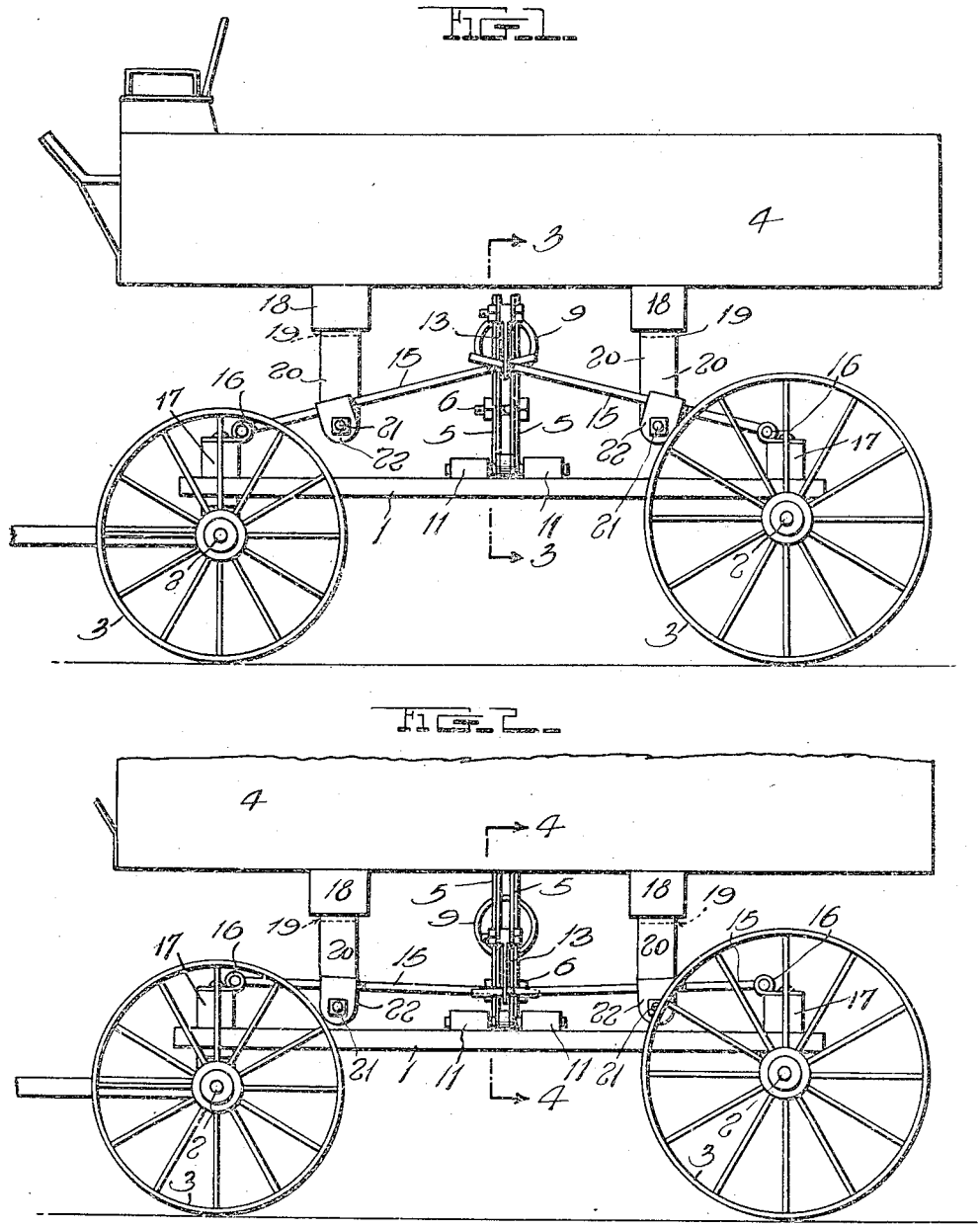

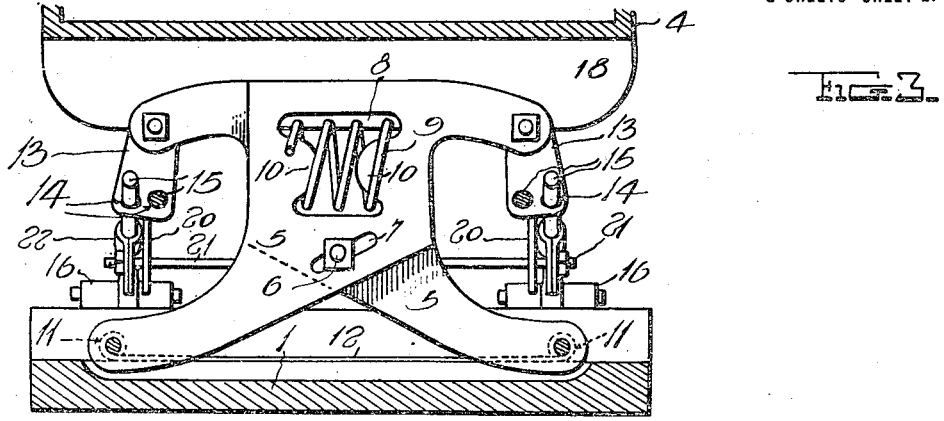
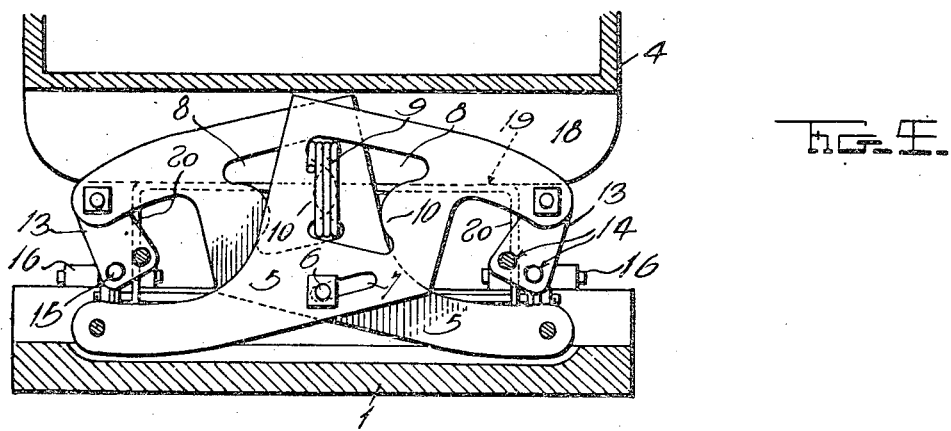

ANDREW HALLNER, OF ARBOGA, CALIFORNIA.

VEHICLE-SPRING.

1,252,690.  Specification of Letters Patent.  Patented Jan. 8, 1918.

Application filed May 29, 1917. Serial No. 171,674.

*To all whom it may concern:*

Be it known that I, ANDREW HALLNER, a citizen of the United States, residing at Arboga, in the county of Yuba and State of California, have invented certain new and useful Improvements in Vehicle-Springs; and I do declare the following to be a full, clear, and exact description of the invention, such as will enable others skilled in the art to which it appertains to make and use the same.

My invention relates to improvements in cushioning springs such as those employed on vehicles, but it is to be understood that the arrangement of parts hereinafter disclosed is applicable also for other purposes.

The principal object of the invention is to provide an extremely simple yet a highly efficient device of the class specified which, although permitting movement of two bodies toward and away from each other, will not permit relative tilting thereof.

With the foregoing general object in view, the invention resides in the novel features of construction and unique combinations of parts to be hereinafter fully described and claimed, the descriptive matter being supplemented by the accompanying drawings which constitute a part of this application and in which:

Figure 1 is a side elevation of a vehicle showing the application of the improved spring thereto;

Fig. 2 is a similar view with the spring compressed;

Figs. 3 and 4 are vertical transverse sections on the planes of the lines 3—3 and 4—4 respectively of Figs. 1 and 2;

Fig. 5 is an elevation of a slightly different form of construction.

In the drawings above briefly described, the numeral 1 designates a suitable support mounted on axles 2 having the usual or any preferred type of wheels 3, a vehicle body 4 being spaced above the support and sustained by the improved spring mechanism now to be described.

Two crossed levers 5 of any suitable configuration are slidably connected by means of a bolt or the like 6 passing through slots 7, which slots may be inclined as shown in Figs. 3 and 4 or horizontal as disclosed in Fig. 5, each lever being preferably formed of a number of sections disposed side by side but this construction is not essential. The crossed portions of levers 5 are formed with registering openings 8 whose ends constitute abutments for a coiled spring 9 which is positioned in said openings, lugs 10 being formed on the end walls of the openings 8 and received in the ends of said spring to retain the latter in place. The lower ends of the levers 5 are shown pivoted between knuckles 11 on metal straps 12 which extend across the upper side of the support 1, at the center of the latter, whereas the ends of said levers are equipped with links 13 pivoted thereto. The links 13 have guide openings 14 formed in their lower ends, and the inner ends of front and rear pairs of levers 15 are received for sliding and for slight canting in said openings, the other ends of said levers being fulcrumed at 16 to transverse cleats or the like 17 which extend across the upper side of the support 1. The bottom of the body 4 is equipped with transverse cleats 18 to which transverse bars 19 are secured, said bars having their ends bent downwardly to form ears 20 which are pivoted by means of transverse rods or the like 21, to slides 22 which are mounted on the levers 15.

By the construction so far described, the use of one spring 9 and two levers 5 is sufficient to support the body, it being necessary, however, to employ a spring having a rather high tension, although the strain exerted on said spring may be controlled by varying the lengths of the upper and lower ends of the levers. When the front or the rear end of the body is forced downwardly from any cause, one or the other of the pairs of levers 15 will be similarly moved so that through the instrumentality of the links 13, the other pair of levers is correspondingly depressed, thus insuring that no forward and rearward tilting of the body shall take place. It is obvious that as the inner ends of the levers 15 move downwardly, they rock the levers 5 against the tension of the spring 9, it being this spring which absorbs all shocks and jars. Lateral tilting of the body is prevented by the unique arrangement of parts and it will thus be seen that the invention is well adapted for hauling receptacles containing liquids which should be prevented as far as possible from splashing. The arrangement described, however, is also applicable for other uses as will be clearly understood.

In Fig. 5, the levers 15 and associated parts are omitted and the links 13' are shown pivoted to the body 4. This pivotal connection may be of any suitable type, it being understood that the connection shown in the drawing is for illustrative purposes only. It may be furthermore explained that the device, when used without the levers 15, may be employed for numerous other purposes in addition to that shown and described.

From the foregoing, taken in connection with the accompanying drawings, it will be obvious that although the invention is of extremely simple and inexpensive construction, it will be highly efficient and durable. Particular emphasis is laid upon the fact that the springs 9 and the associated parts serve to absorb shocks and jars either when the body 4 is moving downwardly or upwardly. Separate shock absorbing means for the recoil are therefore unnecessary in the present invention. Since probably the best results are obtained by the general arrangement of parts shown and described, they constitute the preferred form of the spring but I wish it understood that within the scope of the invention as claimed, numerous changes may be made without sacrificing the principal advantages.

I claim:

1. A spring comprising a pair of levers crossed between their ends and having means at said ends for connecting them pivotally with two relatively movable parts, means movable longitudinally of said levers and connecting them pivotally and slidably at their crossing point, opposed abutments on the crossed portions of said levers, and a compression spring interposed between said abutments.

2. A spring comprising a pair of crossed slidably connected levers having means at their ends for connecting them pivotally to relatively movable parts, the crossed portions of said levers having registering openings, and a cushioning spring positioned in said openings.

3. A spring comprising a pair of crossed slidably connected levers having means at their ends for connecting them pivotally to relatively movable parts, the crossed portions of said levers having registering openings provided at their opposed ends with inwardly extending lugs, and a coiled spring positioned in said openings, said lugs extending into the ends of said spring to retain the latter in place.

4. The combination with a pair of relatively movable members, of a pair of crossed yieldably connected levers pivoted at one end to one of said members, links pivoted to the other ends of said levers and having guides, two pairs of levers having their inner ends received slidably in said guides, the outer ends of said levers being fulcrumed to said one member, and means connecting said two pairs of levers to the other member.

5. The combination with a pair of relatively movable members, of a pair of crossed yieldably connected levers pivoted at one end to one of said members, links pivoted to the other ends of said levers and having guides, two pairs of levers having their inner ends received slidably in said guides, the outer ends of said levers being fulcrumed to said one member, and slides carried by the other member and mounted on said two pairs of levers.

6. The combination with a pair of relatively movable members, of a pair of crossed yieldably connected levers pivoted at one end to one of said members, two pairs of levers having their inner ends slidably connected to the other ends of said first named levers, the outer ends of said pairs of levers being fulcrumed to said one member, and means connecting said two pairs of levers to the other member.

7. The combination with the running gear of a vehicle, and the body above said running gear, of front and rear pairs of longitudinally extending levers fulcrumed at their outer ends to said running gear, slides mounted on said levers and carried by the body, vertical links having guide openings receiving the inner ends of said levers, crossed levers extending transversely of the running gear and pivoted at one end thereto, said links depending from the other ends of said levers, and spring means for permitting said last named ends to yield downwardly.

8. The combination with two members movable toward and away from each other, of two pairs of levers fulcrumed at their outer ends to one of said members, means connecting the intermediate portions of said levers to the other member, a third pair of levers extending transversely of said first-named levers and connected to the inner ends thereof, and yielding means for controlling the movement of said transverse levers.

In testimony whereof I have hereunto set my hand in the presence of two subscribing witnesses.

ANDREW HALLNER.

Witnesses:
JUDITH S. HALLNER,
EDWIN E. LASSON.